(12) United States Patent
Moe et al.

(10) Patent No.: US 7,047,725 B2
(45) Date of Patent: May 23, 2006

(54) ASSEMBLY AND METHOD FOR AIRCRAFT ENGINE NOISE REDUCTION

(75) Inventors: Jeffrey W. Moe, Chula Vista, CA (US); Stuart J. Byrne, San Diego, CA (US); Norman J. James, San Diego, CA (US); Ricardo A. Burdisso, Blacksburg, VA (US)

(73) Assignee: Rohr, Inc., Chula Vista, CA (US)

(*) Notice: Subject to any disclaimer, the term of this patent is extended or adjusted under 35 U.S.C. 154(b) by 352 days.

(21) Appl. No.: 10/446,896

(22) Filed: May 28, 2003

(65) Prior Publication Data

US 2004/0237502 A1    Dec. 2, 2004

(51) Int. Cl.
*B64F 1/26* (2006.01)

(52) U.S. Cl. .................. 60/262; 181/210; 181/214
(58) Field of Classification Search ............... 60/226.1, 60/262; 181/210, 213, 214, 215, 216
See application file for complete search history.

(56) References Cited

U.S. PATENT DOCUMENTS

| | | | |
|---|---|---|---|
| 3,542,152 A * | 11/1970 | Oxx Jr, et al. ............... | 181/214 |
| 3,637,140 A | 1/1972 | Palovchik | |
| 3,721,389 A | 3/1973 | MacKinnon et al. | |
| 4,531,362 A | 7/1985 | Barry et al. | |
| 5,702,231 A | 12/1997 | Dougherty | |
| 5,743,488 A * | 4/1998 | Rolston et al. ............ | 244/53 B |
| 6,112,514 A | 9/2000 | Burdisso et al. | |
| 6,135,238 A * | 10/2000 | Arcas et al. ................ | 181/292 |

FOREIGN PATENT DOCUMENTS

| | | |
|---|---|---|
| DE | 728617 | 11/1942 |
| DE | 434 1951 | 12/1992 |
| EP | 1 067 511 A2 | 1/2001 |
| GB | 1 298 069 | 11/1972 |
| JP | 06348280 | 12/1994 |
| WO | WO 02/059474 | 8/2002 |

* cited by examiner

Primary Examiner—Charles G. Freay
(74) Attorney, Agent, or Firm—Goodwin Procter LLP

(57) ABSTRACT

An assembly useful in reducing aircraft engine noise such as turbofan engine noise comprises: (a) a core portion comprising at least one entrance end and at least one exit end for the passage of acoustic energy therethrough; (b) a first member having an exterior face and an interior face, wherein the first member is adjacent to at least a part of the core portion, and the first member has a plurality of openings therein to permit the passage of acoustic energy therethrough; and (c) a second member having an exterior face and an interior face, wherein the interior face of the second member is adjacent to the core portion. The core portion may be a honeycomb acoustic structure, and the first member may be perforated to permit the passage of acoustic energy into and out of the conduit portion.

20 Claims, 14 Drawing Sheets

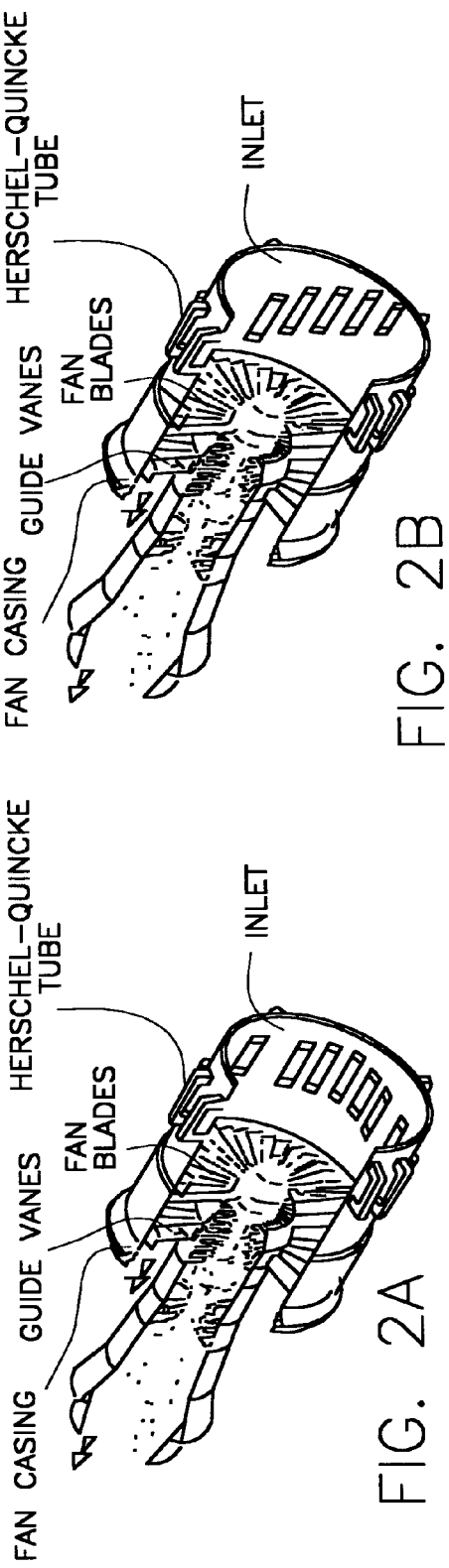
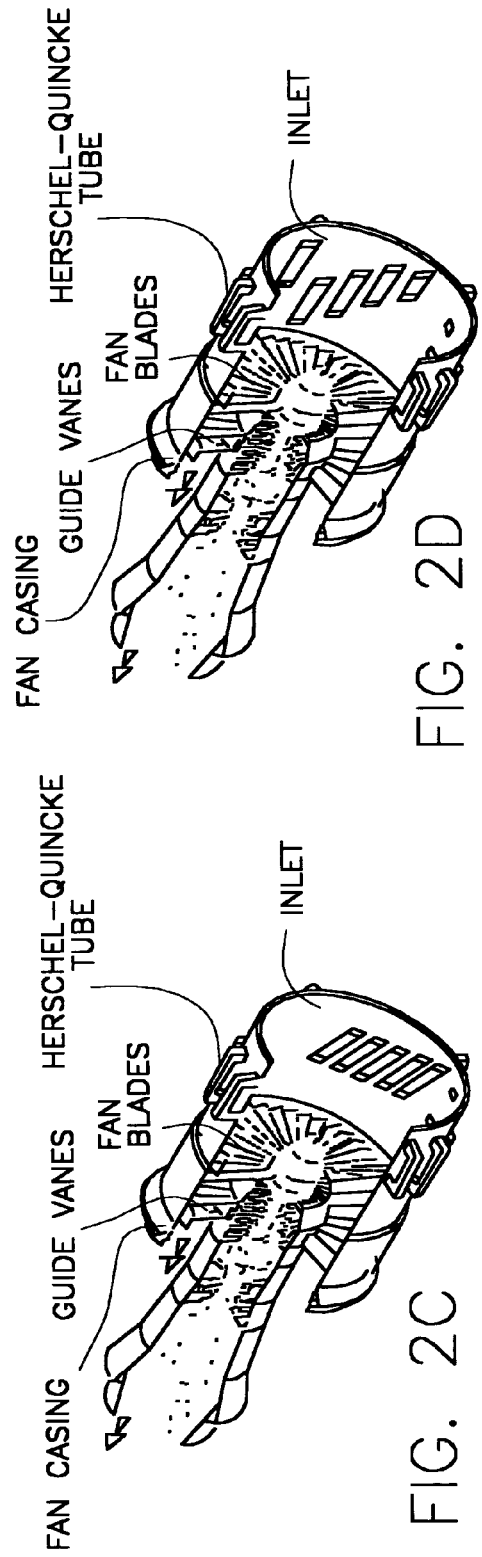
FIG. 2A
FIG. 2B
FIG. 2C
FIG. 2D
(PRIOR ART)

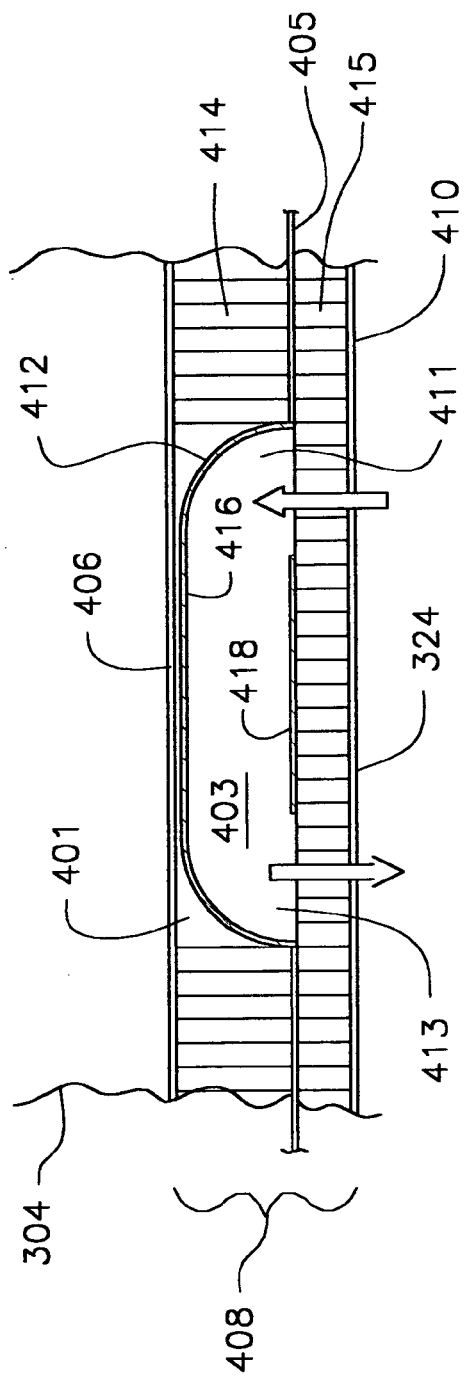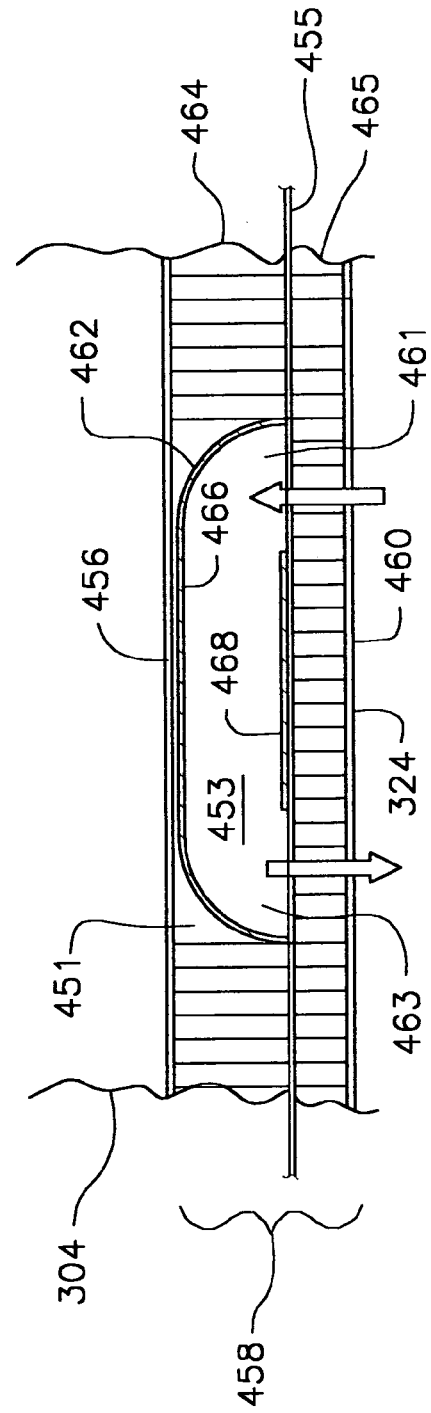

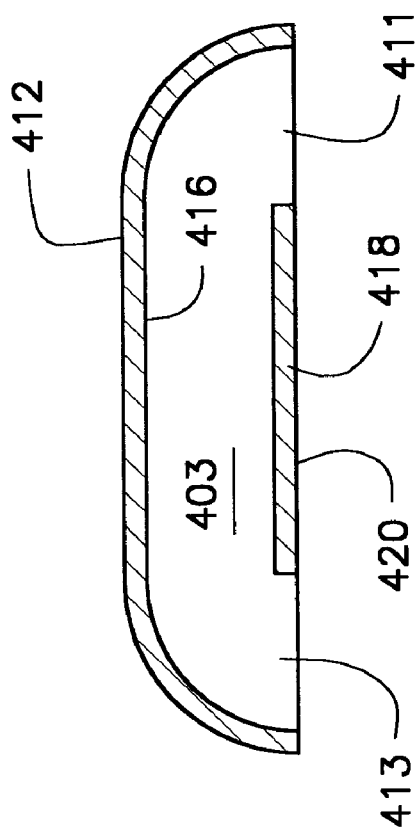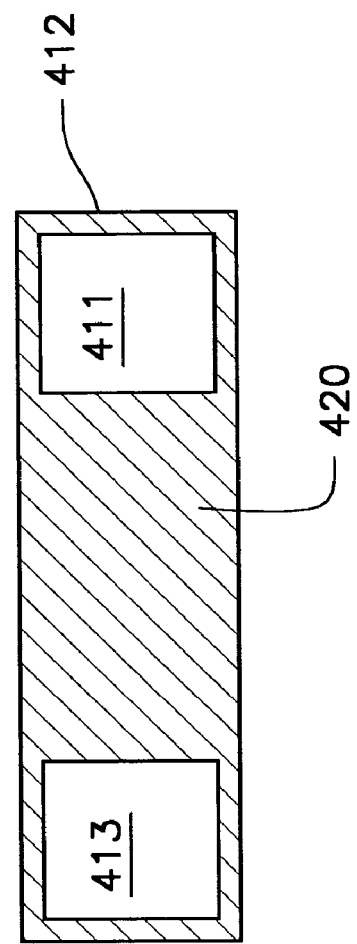
FIG. 8A
FIG. 8B

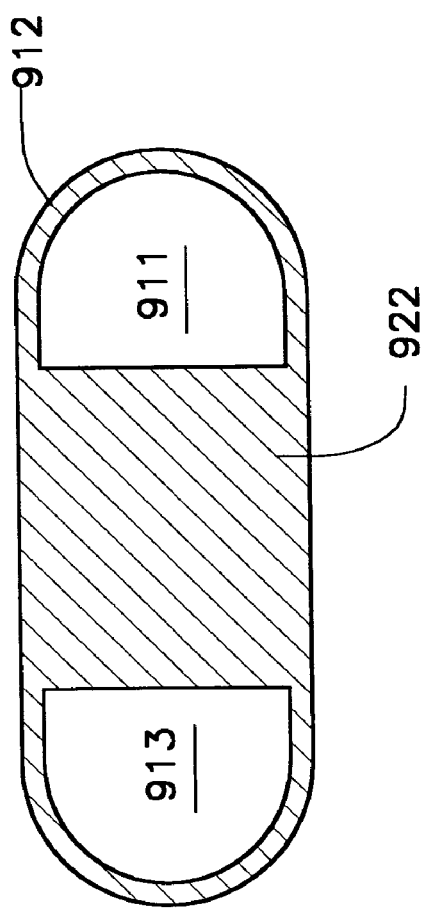
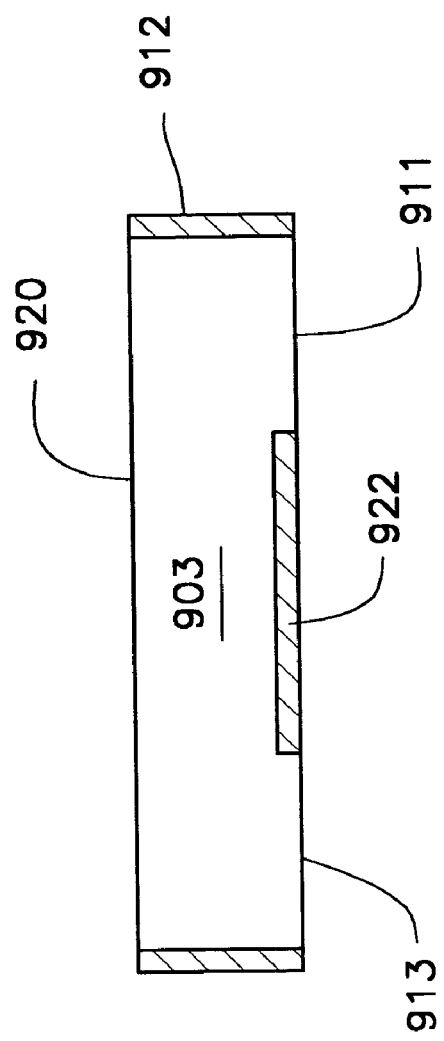

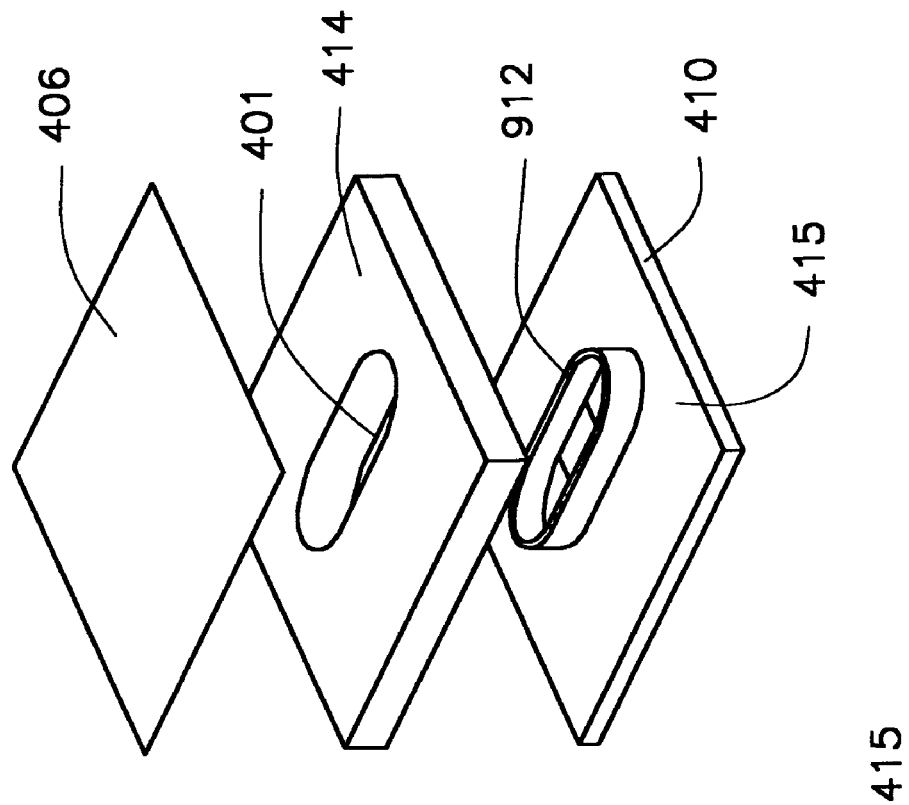
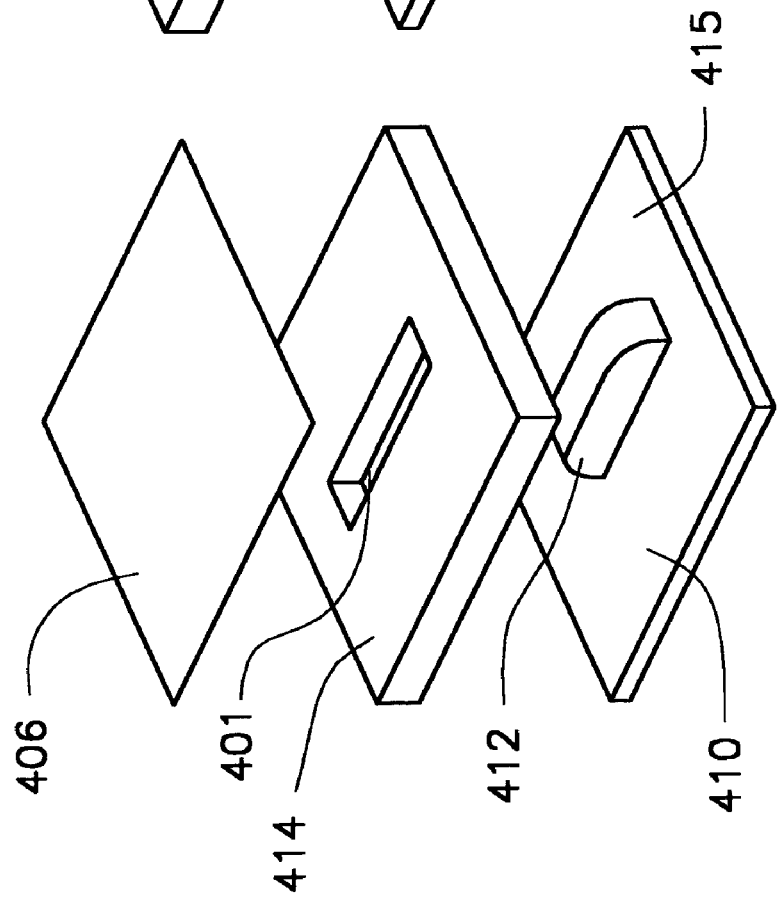

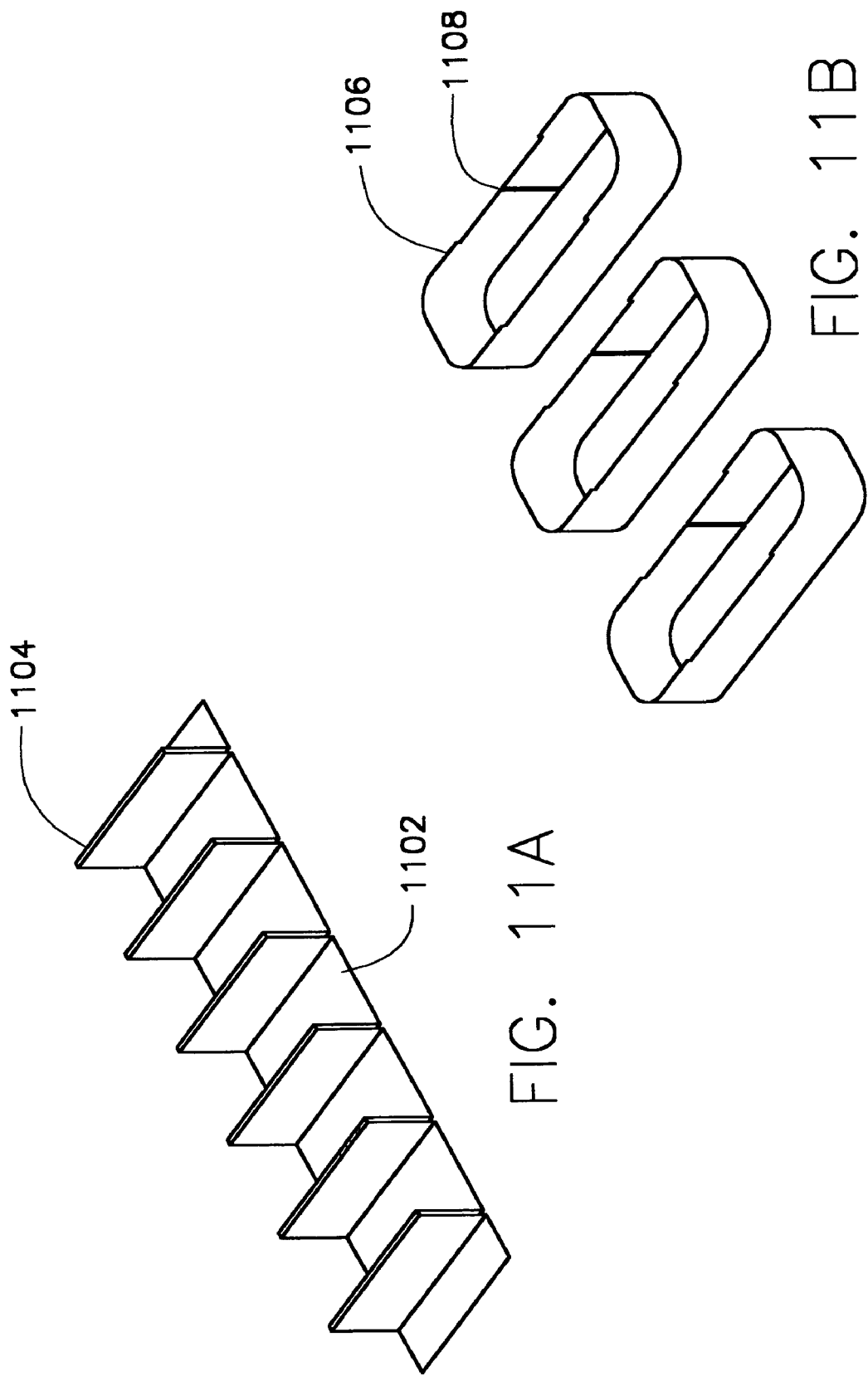

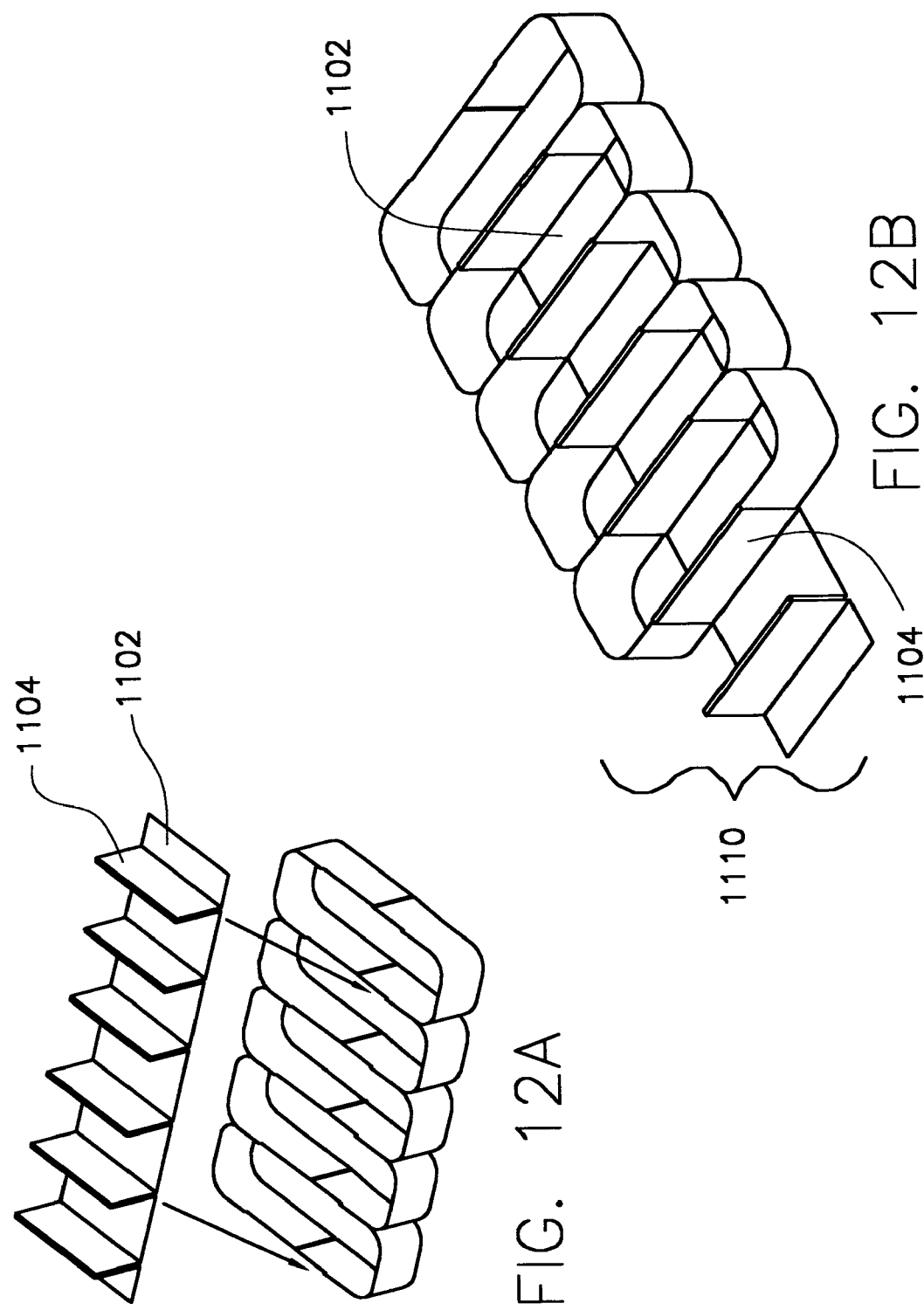

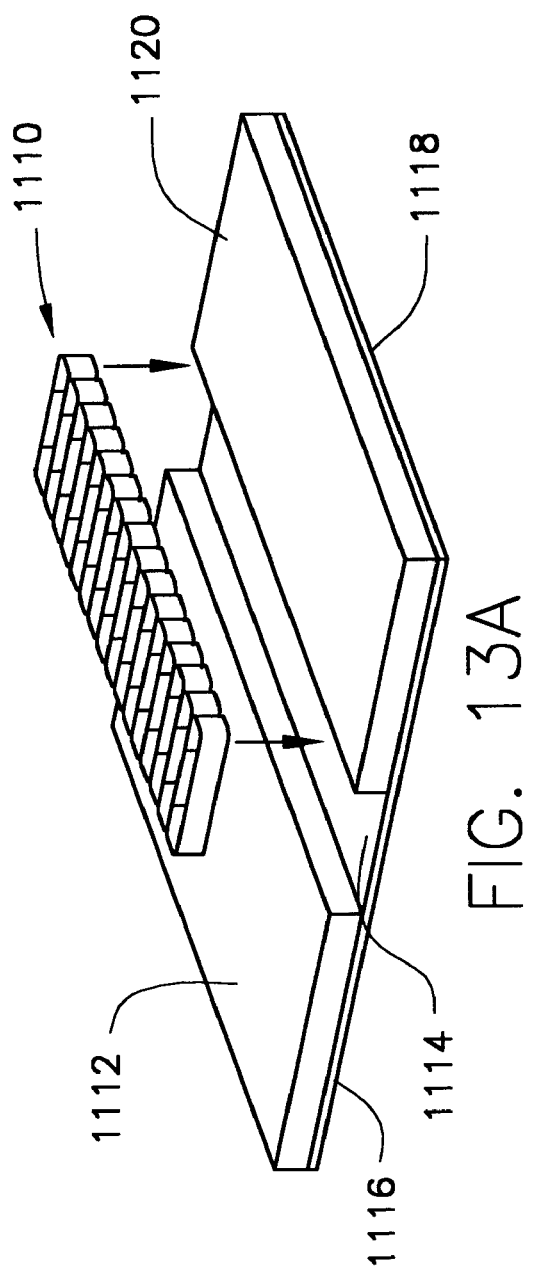
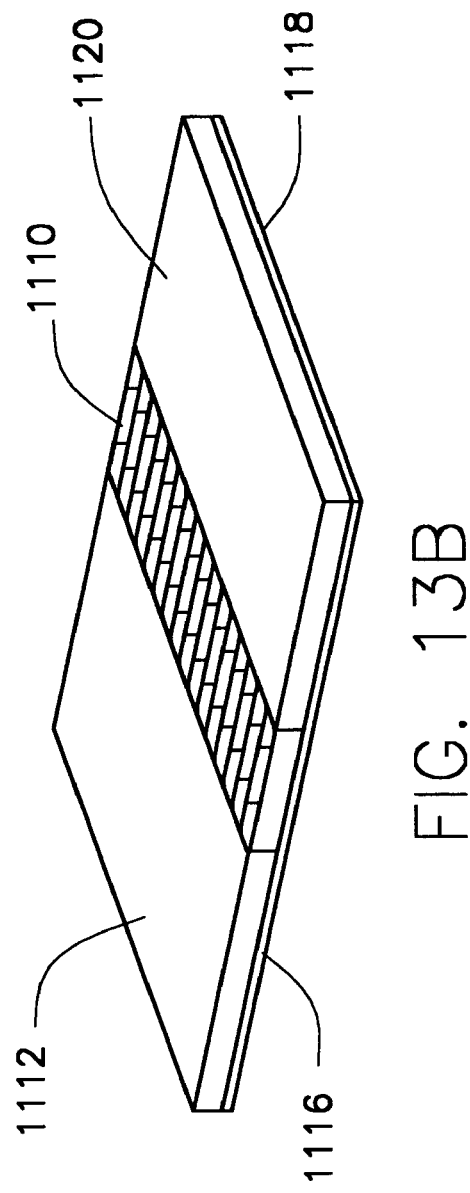

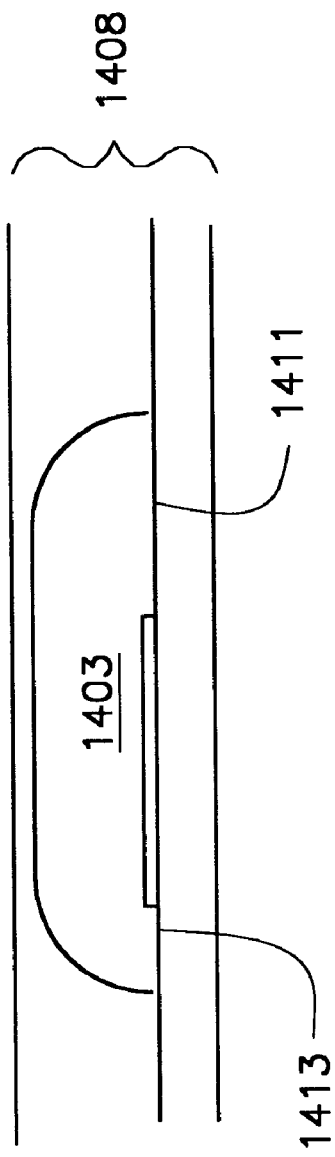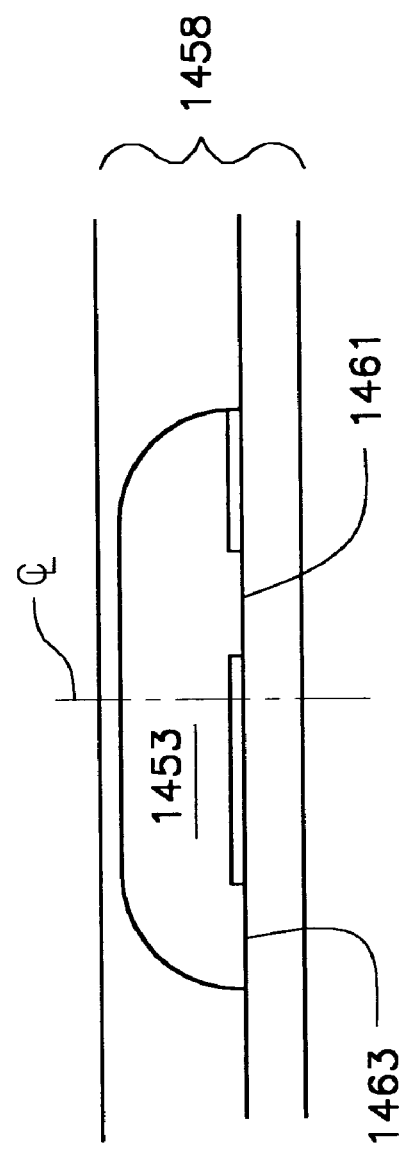

ASSEMBLY AND METHOD FOR AIRCRAFT ENGINE NOISE REDUCTION

BACKGROUND OF THE INVENTION

1. Field of the Invention

This invention is directed to an assembly, method and system for reducing aircraft noise generated by aircraft engines such as turbofan engines, and to a method of making such an assembly. More particularly, this invention relates to an assembly located in a portion of an aircraft such as a turbofan engine nacelle inlet, engine fan case, core cowl, thrust reverser, core casing, and/or center body. The assembly comprises a core portion having at least one entrance end and at least one exit end for the passage of acoustic energy therethrough. The assembly also comprises a first member having an exterior face and an interior face, wherein the first member is adjacent to at least a portion of the core, and the first member has a plurality of openings therein to permit the passage of acoustic energy therethrough.

2. Background Information

The desirability of reducing the noise generated by aircraft engines such as turbofan engines is well known to those skilled in the art. As disclosed, for example, in U.S. Pat. No. 6,112,514, one method of reducing such noise which has been proposed is the use of Herschel-Quincke (H-Q) tubes of appropriate length arranged in an array about a turbofan engine to reduce the noise levels generated by the engine. Such an array of tubes, if properly located about the engine, creates destructive energy waves that cancel the acoustic energy in the turbofan engine yet do not contribute to any significant aircraft drag or reduced fuel consumption. As is also disclosed in U.S. Pat. No. 6,112,514, various parameters such as tube length, cross-sectional area etc. may be controlled via a control system responsive to varying engine operational or environmental conditions. In such a control system, sound is reintroduced in an out-of-phase relation from the sound propagating from the engine fan to effect sound cancellation. Such a control system may employ feedback or feedforward control, or a combination thereof. WO 02/059474 discloses an assembly and method for reducing such noise using at least one dynamically adaptable H-Q tube which is capable of being dynamically adapted with respect to tube geometry and acoustical characteristics to optimize cancellation of the predominant source tone for different engine cycles.

Existing H-Q tube configurations such as those described in U.S. Pat. No. 6,112,514 and WO 02/059474 are attached to the external surface of aircraft components, and thus are limited to specific shapes which are not always amenable to integration with the structure of the engine. However, it would be useful to employ a noise reduction assembly, which is integrated into the structure of aircraft components such as the turbofan engine nacelle core cowl. Accordingly, the assemblies of this invention may be employed in areas of little or no clearance, such as the core cowl. In contrast, a prior art external H-Q tube cannot be employed within the core cowl, because the external H-Q tube will physically interfere with other components.

In addition, although the use of an array of H-Q tubes within a "passive liner treatment" has previously been disclosed, for example, in U.S. Pat. No. 6,112,514, such a configuration employs an array of tubes which is not substantially contained within the passive liner treatment. In contrast, according to the present invention, the acoustic energy passes through, for example, conduit or conduits which are substantially contained within the core portion, thereby achieving various structural and cost benefits. In addition, U.S. Pat. No. 6,112,514 does not disclose the use of a first member having a plurality of openings therein (such as a perforated skin) which is operatively employed with entrance and exit ends of the core portion to permit the passage of acoustic energy into and out of the conduit. Moreover, in U.S. Pat. No. 6,112,514 a screen is required at the ends of the tubes. In contrast, the assembly of this invention does not employ a screen at the entrance and exit ends of the core portion.

Accordingly, it is one object of this invention to provide a noise reduction assembly which may be integrated within the structure of aircraft components. It is another object of this invention to provide a method of reducing aircraft noise using such an assembly. It is yet another object of this invention to provide an aircraft noise reduction system which employs such an assembly. Other objects, features and advantages of the present invention will be apparent to those skilled in the art from the detailed description of the invention and its various embodiments as described herein.

SUMMARY OF THE INVENTION

According to the present invention, an assembly useful in reducing aircraft engine noise such as turbofan engine noise comprises:

(a) a core portion comprising at least one entrance end and at least one exit end for the passage of acoustic energy therethrough;

(b) a first member having an exterior face and an interior face, wherein the first member is adjacent to at least a part of the core portion, and the first member has a plurality of openings therein to permit the passage of acoustic energy therethrough; and (c) a second member having an exterior face and an interior face, wherein the interior face of the second member is adjacent to the core portion.

A system for reducing aircraft engine noise comprises:

(a) an apparatus for generating non-uniform noise energy about an aircraft structure; and (b) an assembly for reducing aircraft noise comprising:

(i) a core portion comprising at least one entrance end and at least one exit end for the passage of acoustic energy therethrough, (ii) a first member having an exterior face and an interior face, wherein the first member is adjacent to at least a part of the core portion, and the first member has a plurality of openings therein to permit the passage of acoustic energy therethrough, and (iii) a second member having an exterior face and an interior face, wherein the interior face of the second member is adjacent to the core portion.

In one embodiment, the core portion is a honeycomb acoustic structure having a conduit therein, and the first member is perforated to permit the passage of acoustic energy into and out of the conduit.

In another embodiment, a plurality of conduits are located within the assembly, the core portion is a honeycomb acoustic structure which substantially contains the conduits, and the first member is perforated to permit the passage of acoustic energy into and out of the conduits.

A method of making an assembly for reducing aircraft engine noise is also described. The method comprises:

(a) providing a support member having a plurality of vertical walls;

(b) providing a plurality of enclosure members having a plurality of vertical walls;

(c) forming a subassembly by having at least one vertical wall of at least one enclosure member adjoin at least one vertical wall of at least one support member;
(d) providing a core portion having an aperture, a first face, and a second face;
(e) providing a first member having an exterior face and interior face, wherein the interior face of the first member is adjacent to at least a part of the first face of the core portion, and the first member has a plurality of openings therein to permit the passage of acoustic energy therethrough;
(f) providing the subassembly into the core aperture; and
(g) providing a second member adjacent to the second face of the core portion, such that the subassembly and second member define a conduit to permit the passage of acoustic energy therethrough.

BRIEF DESCRIPTION OF THE DRAWINGS

FIGS. 2A–2D depicts prior art arrangements of H-Q tubes in a turbofan aircraft engine.

FIG. 4A depicts a cross-sectional view of one embodiment of the assembly of this invention.

FIG. 4B depicts a cross-sectional view of another embodiment of the assembly of this invention.

FIGS. 8A and 8B depict cross-sectional and bottom views, respectively, of the conduit-defining member used in the assembly of this invention depicted in FIGS. 4A and 4B.

FIGS. 9A and 9B depict cross-sectional and bottom views, respectively, of another embodiment of the conduit-defining member which may be used in the assembly of this invention.

FIG. 10A depicts an exploded view of an assembly of this invention using the conduit portion of FIGS. 8A and 8B.

FIG. 10B depicts an exploded view of an assembly of this invention using the conduit portion of FIGS. 9A and 9B.

FIGS. 11A and 11B depict a support member and enclosure members which are used to form one embodiment of the assembly of this invention.

FIGS. 12A and 12B depict the formation of a subassembly using the support member and enclosure members of FIGS. 11A and 11B.

FIGS. 13A and 13B depict the formation of one embodiment of the assembly of this invention using the subassembly of FIGS. 12A and 12B.

FIGS. 14A and 14B depict cross sectional views of other embodiments of the assembly of this invention.

DETAILED DESCRIPTION OF THE INVENTION

This invention is directed to an assembly, method and system for reducing fan noise from a noise generating system such as a turbofan engine, and to a method of preparing such an assembly. In a preferred embodiment, the assembly, method and system of this invention are used with a turbofan engine. However, other systems such as, for example, systems that generate noise which propagates in a partially enclosed area, such as air ventilation ducts, are equally contemplated for use with the present invention. Accordingly, the assembly, method and apparatus of this invention are not limited to use in conjunction with turbofan engines only, but instead may be used with other noise generating devices or systems. The dimensions of the assembly of this invention, including acoustic energy path length, width, shape and other variables and quantities specified herein may vary depending on the particular application of this invention. Accordingly, numbers and dimensions specified herein are not to be construed as limitations on the scope of this invention, but are meant to be merely illustrative of one particular application.

For exemplary purposes only, the noise reduction system of the present invention is described with reference to reducing noise in turbofan engines. According to this exemplary embodiment, the noise reduction system of the present invention effectively reduces noise energy over a wide range of frequencies for both tonal and broadband components of the inlet and outlet noise for turbofan engines. Specifically, the noise reduction system of the present invention utilizes at least one assembly preferably comprising at least one conduit, more preferably a plurality of such conduits arranged in a series or parallel array substantially within an acoustic panel within a turbofan engine to reduce the noise levels generated by the turbofan engine. The assembly or assemblies may also be placed at the inlet, and in other locations, such as, for example, in either the upstream or downstream locations of the turbofan engine. The inlet and outlet of the conduits of the assembly can be placed parallel to the engine axis or at an angle. By using an array of such assemblies in the turbofan engine nacelle inlet (or other noise generating systems), destructive waves are created that cancel the acoustic energy in the turbofan engine, without contributing to any significant aircraft drag or reduced fuel consumption.

FIG. 1 and FIGS. 2A–2D are illustrative of the operation of prior art H-Q tube systems, as set forth and described in U.S. Pat. No. 6,112,514, incorporated herein by reference. In FIGS. 1 and 2A–2D, the H-Q tubes are tubular passageways attached to the exterior surface of the annular duct structure and penetrate through the duct walls.

Figure 1:
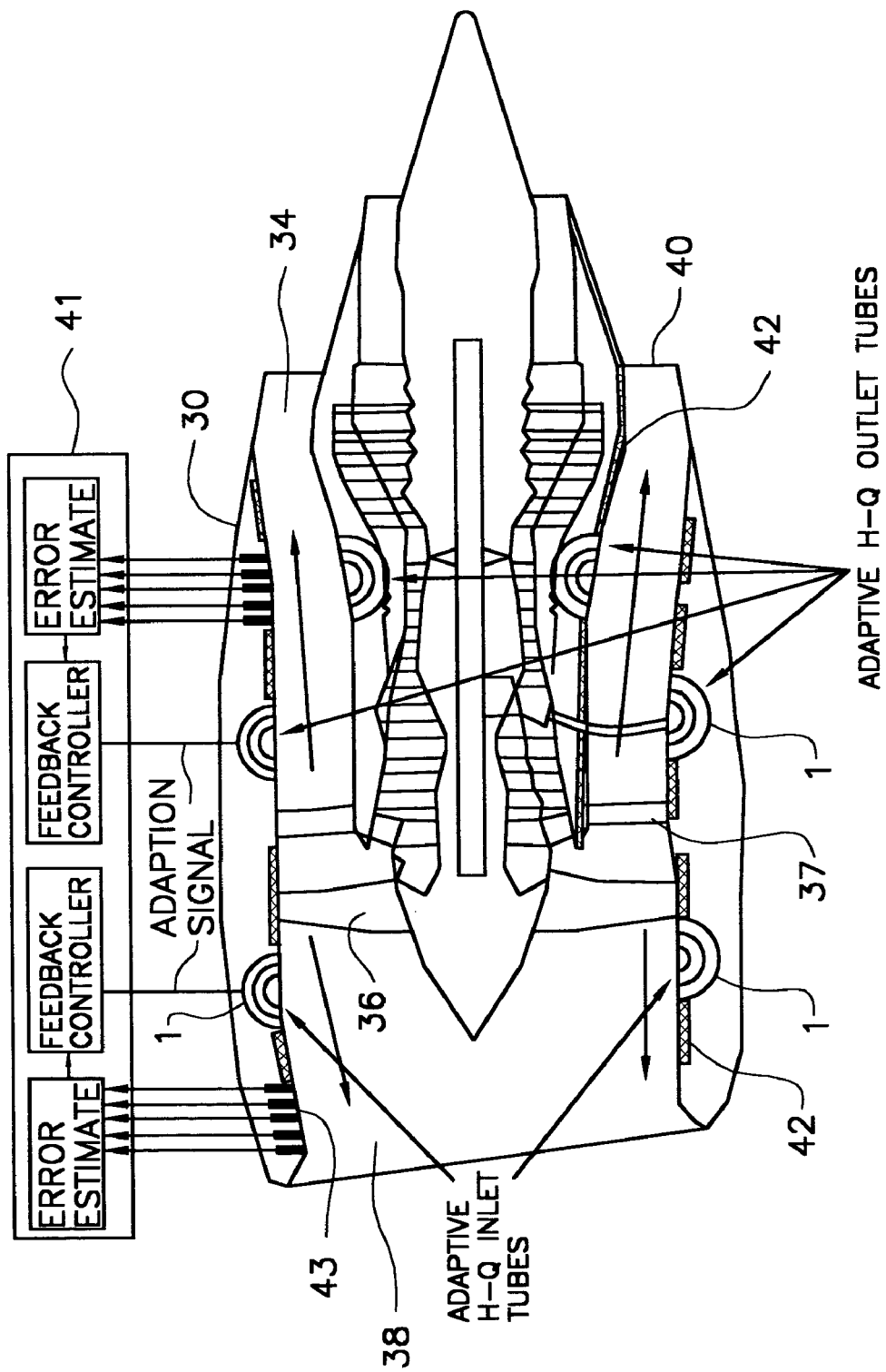
FIG. 1 depicts a prior art arrangement of H-Q tubes in a turbofan aircraft engine.
Figure 3:
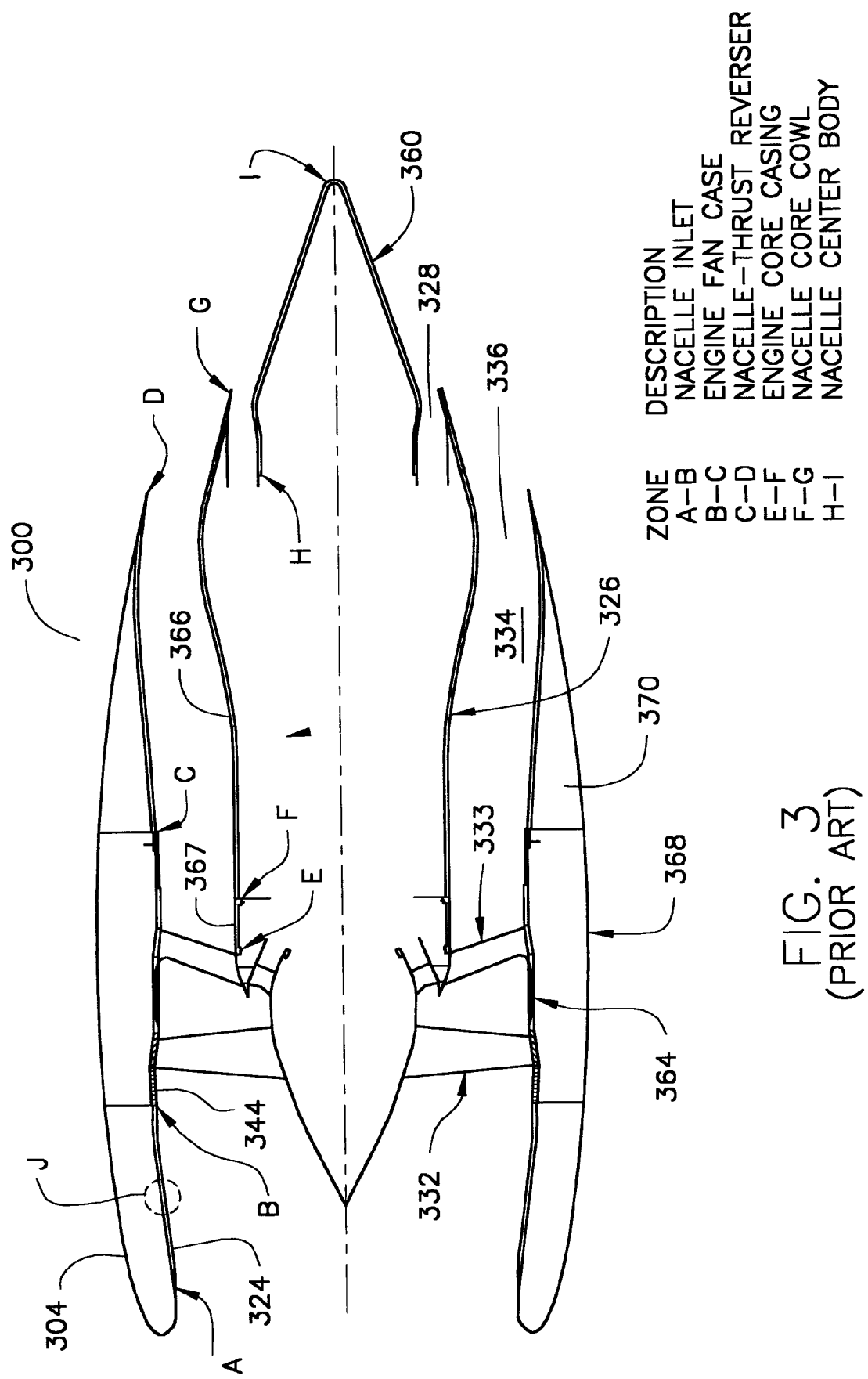
FIG. 3 depicts a turbofan aircraft engine of the type in which the assembly of this invention may be employed.

FIG. 3 depicts a cross-sectional view of a turbofan aircraft engine of the type in which the assembly of this invention may be employed. In FIG. 3, engine 300 has nacelle 304, which includes nacelle inlet 324, core section 326, primary exhaust section 328, fan cowl 368, and core cowl 366. Located downstream from the nacelle inlet 324 are fan 332 and stator 333. Fan 332 sends bypass air through fan duct 334 which is exhausted via fan duct outlet 336. The assembly of this invention may be employed, for example, in the nacelle inlet 324 (defined by the region between areas A and B), the engine fan case 364 (defined by the region between areas B and C), the core cowl 366 (defined by the region between areas F and G), the nacelle-thrust reverser 370 (defined by the region between areas C and D), the engine core casing 367 (defined by the region between areas E and F), and/or center body 360 (defined by the region between areas H and I).

FIG. 4A depicts a cross-sectional view of one embodiment of this invention, in which the embodiment depicted is a cross-sectional view of the nacelle portion designated "J" in FIG. 3. In FIG. 4A, the nacelle 304 contains a backskin or panel 406, a core assembly 408, and a perforated skin or panel 410, which forms at least a part of the inner wall of nacelle inlet 324, as shown. Core assembly 408 contains a cavity 401 which in turn contains a conduit-defining member 412, having a conduit 403 therein. Conduit 403 is defined by outer wall 416 and inner wall 418 and has an entrance end 411 and an exit end 413. As depicted in FIG. 4A, inner wall 418 is essentially parallel to the inner wall (which in this embodiment is perforated skin 410) of nacelle inlet 324, and outer wall 416 is essentially parallel to backskin 406. Conduit-defining member 412 may be fabricated from aluminum, graphite or other suitable materials, and is typically fabricated from the same material as panels 406 or 410. Core assembly 408 is typically a honeycomb structure and may be divided into an upper portion 414 and a lower portion 415 by a septum 405. As is well known to those skilled in the art, the septum separates layers within a honeycomb core, thereby improving the acoustic performance of a honeycomb panel structure. The septum 405 may be fabricated from a metallic sheet having perforations, a metallic mesh material, or a nonmetallic mesh material such as a polymeric mesh material. The use of core assemblies and panel structures for aerospace applications are well known to those skilled in the art, as exemplified by the honeycomb-shaped core panel structures depicted in U.S. Pat. Nos. 4,869,421, 5,445,861 and EP Application No. 1238741. The core assembly may be made of a titanium alloy material such as titanium-aluminide, and the backskin and perforated skin may also be made of a titanium alloy such as a titanium-aluminide facing sheet. The core may have a honeycomb shape, or may have other geometric shapes. The core assembly, backskin and perforated skin may be joined via conventional bonding techniques such as liquid interface diffusion (LID) bonding, brazing and adhesive bonding.

As shown, for example, in FIG. 4A, during operation of the engine, acoustic energy (indicated by arrows) passes through perforated skin 410, enters entrance end 411, and exits via exit end 413. The acoustic energy behaves as a pressure wave, and the pressure differential causes acoustic energy to enter via entrance end 411 and exit via exit end 413. The conduit defined by the entrance end 411 and exit end 413 therefore functions as an acoustic wave guide. In a preferred embodiment, during operation of the engine the flow of air through the conduit is *de minimis*. In a particularly preferred embodiment, in which the assembly of this invention is located in the engine inlet or forward of the fan, no air passes through the conduit. However, if the assembly is located aft of the fan, such as in the by-pass duct, air may pass through the conduit. This is also true for the additional embodiments of the invention described herein.

FIG. 4B depicts a cross-sectional view of another embodiment of this invention, in which the embodiment depicted is a cross-sectional view of the nacelle portion designated "J" in FIG. 3. In FIG. 4B, nacelle 304 contains a backskin or panel 456, a core assembly 458, and a perforated skin or panel 460 which forms at least a part of the inner wall of nacelle inlet 324, as shown. Core assembly 458 contains a cavity 451 which in turn contains a conduit-defining member 462, having a conduit 453 therein. Conduit 453 is defined by outer wall 466 and inner wall 468 and has an entrance end 461 and an exit end 463. As depicted in FIG. 4B, inner wall 468 is essentially parallel to the inner wall (which in this embodiment is perforated skin 460) of nacelle inlet 324, and outer wall 466 is essentially parallel to backskin 456. Conduit-defining member 462 may be fabricated from materials as previously described with respect to conduit-defining member 412 in FIG. 4A. In the embodiment depicted in FIG. 4B, septum 455 divides core assembly 458 into an upper portion 464 and a lower portion 465. The core assembly, backskin, perforated skin and septum may be fabricated from materials as previously described with respect to the embodiment depicted in FIG. 4A. However, unlike the embodiment depicted in FIG. 4A, in FIG. 4B the septum 455 extends continuously through the core assembly 458, as shown. Accordingly, during operation of the engine, acoustic energy (indicated by arrows) passes through perforated skin 460 and septum 455, enters entrance end 461 and exits through septum 455 and exit end 463.

In preferred embodiments of this invention as depicted in FIGS. 4A and 4B, substantial portions of the core reside between the conduit and the perforated skin or panel. For example, in FIG. 4A, lower core portion 415 resides between conduit 403 and perforated skin or panel 410, and in FIG. 4B, lower core portion 465 resides between conduit 453 and perforated skin or panel 460. Accordingly, the conduit 403 is integrated within the core.

Figure 5:
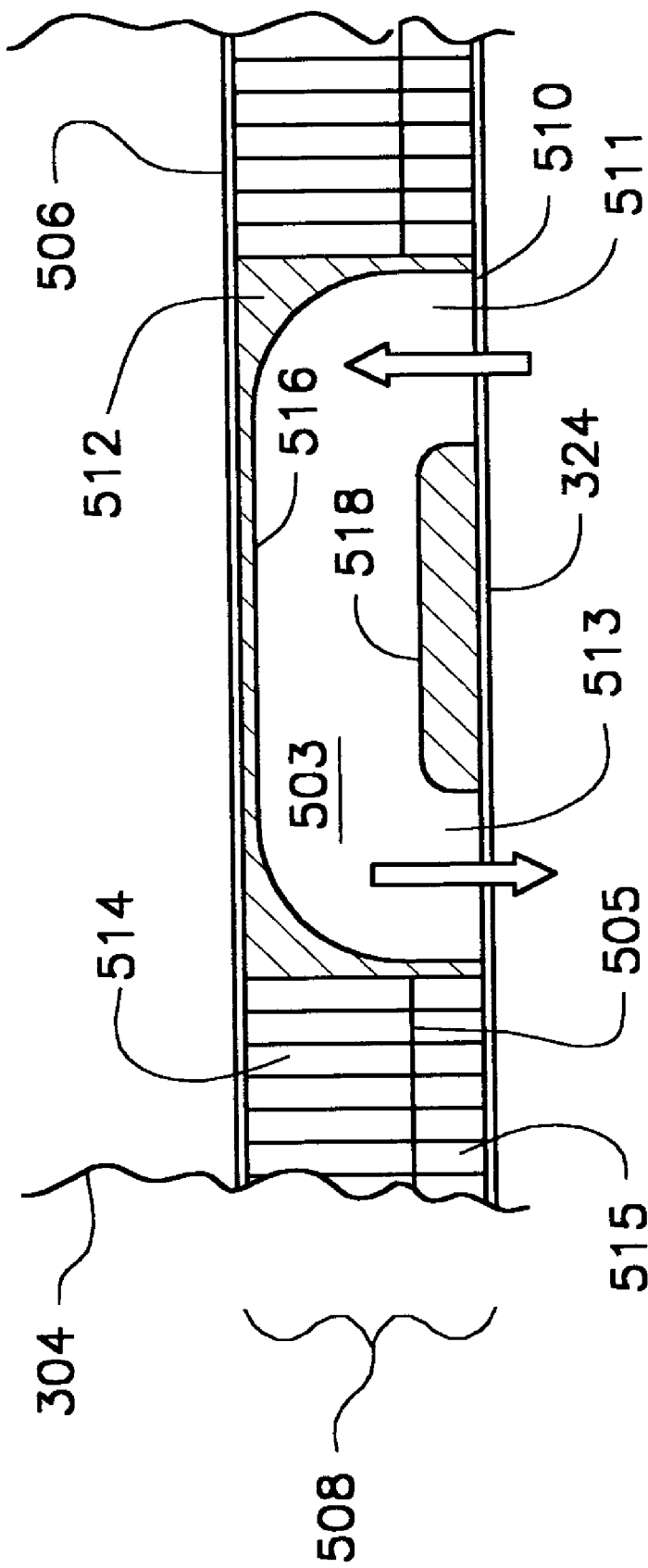
FIG. 5 depicts a cross-sectional view of another embodiment of the assembly of this invention.

FIG. 5 depicts a cross-sectional view of another embodiment of this invention, in which the embodiment depicted is a cross-sectional view of the nacelle portion designated "J" in FIG. 3. In FIG. 5, nacelle 304 contains a perforated skin or panel 510, a backskin or panel 506 which forms at least a part of the inner wall of nacelle inlet 324, as shown, and a honeycomb-shaped core 508 having an upper portion 514 and a lower portion 515 separated by a septum 505. Core 508 contains a conduit-defining member 512 which in this embodiment is machined or otherwise formed or fabricated from a material impervious to acoustic energy such as aluminum or another suitable material and placed in a cavity formed in core 508. Conduit-defining member 512 has a conduit 503 therein. The conduit 503 is defined by outer wall 516 and inner wall 518, and has an entrance end 511 and exit end 513. Acoustic energy (indicated by arrows) passes through perforated skin 510, enters conduit 503 via entrance end 511, and exits via exit end 513. As depicted in FIG. 5, inner wall 518 is essentially parallel to the inner wall (which in this embodiment is perforated skin 510) of nacelle inlet 324, and outer wall 516 is substantially parallel to backskin 506. In another embodiment, inner wall 518 may be acoustically treated, such as by adding perforations to improve system acoustic performance.

Figure 6:
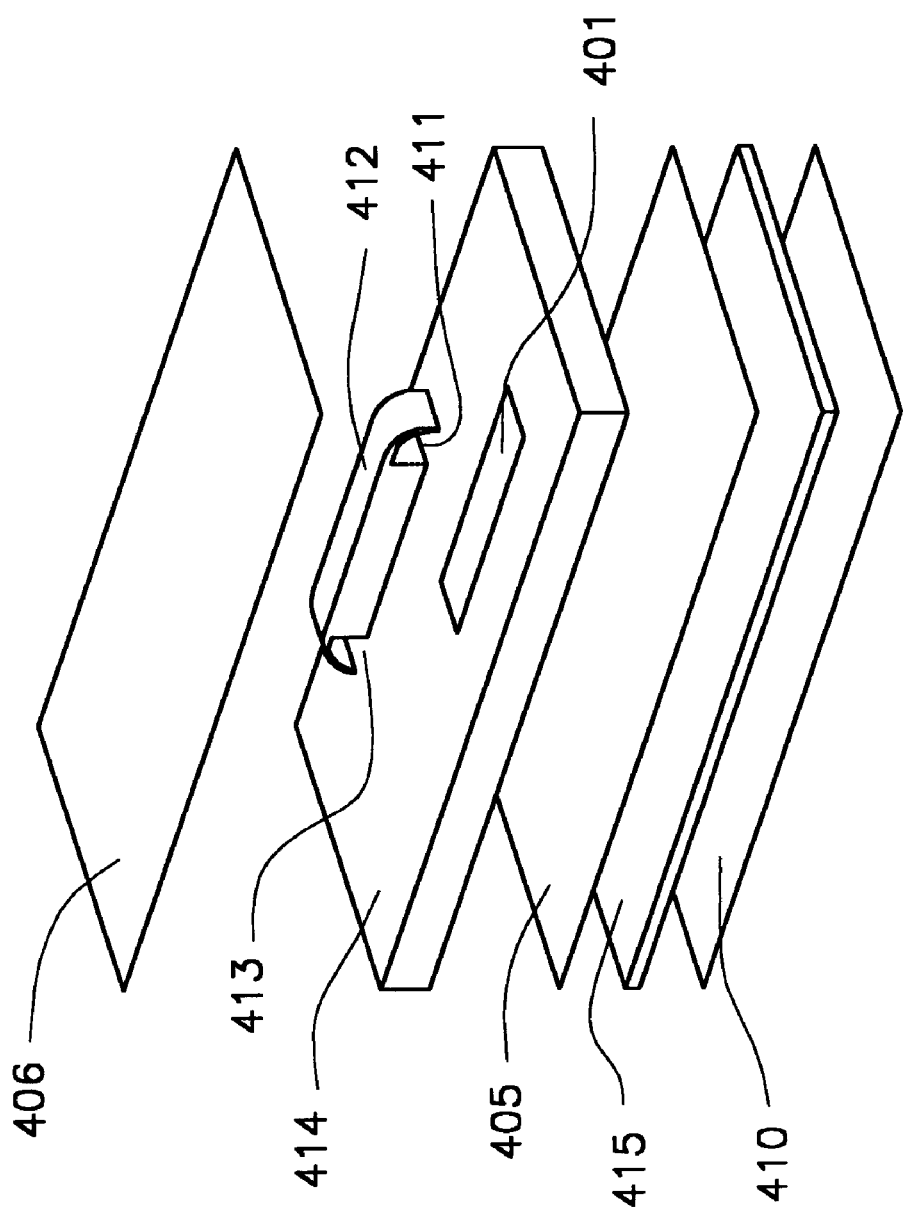
FIG. 6 depicts an exploded view of the embodiment depicted in FIG. 4B.

FIG. 6 depicts an exploded view of the embodiment of FIG. 4B. As shown in FIG. 6, the assembly is made up of a backskin 406, an upper core portion 414 having a cavity 401 therein, a septum 405, a lower core portion 415, and a perforated skin 410. A conduit-defining member 412 having an entrance end 413 and exit end 411 resides within cavity 401. In another embodiment (not shown), the septum may be locally removed in the region of cavity 401.

Figure 7:
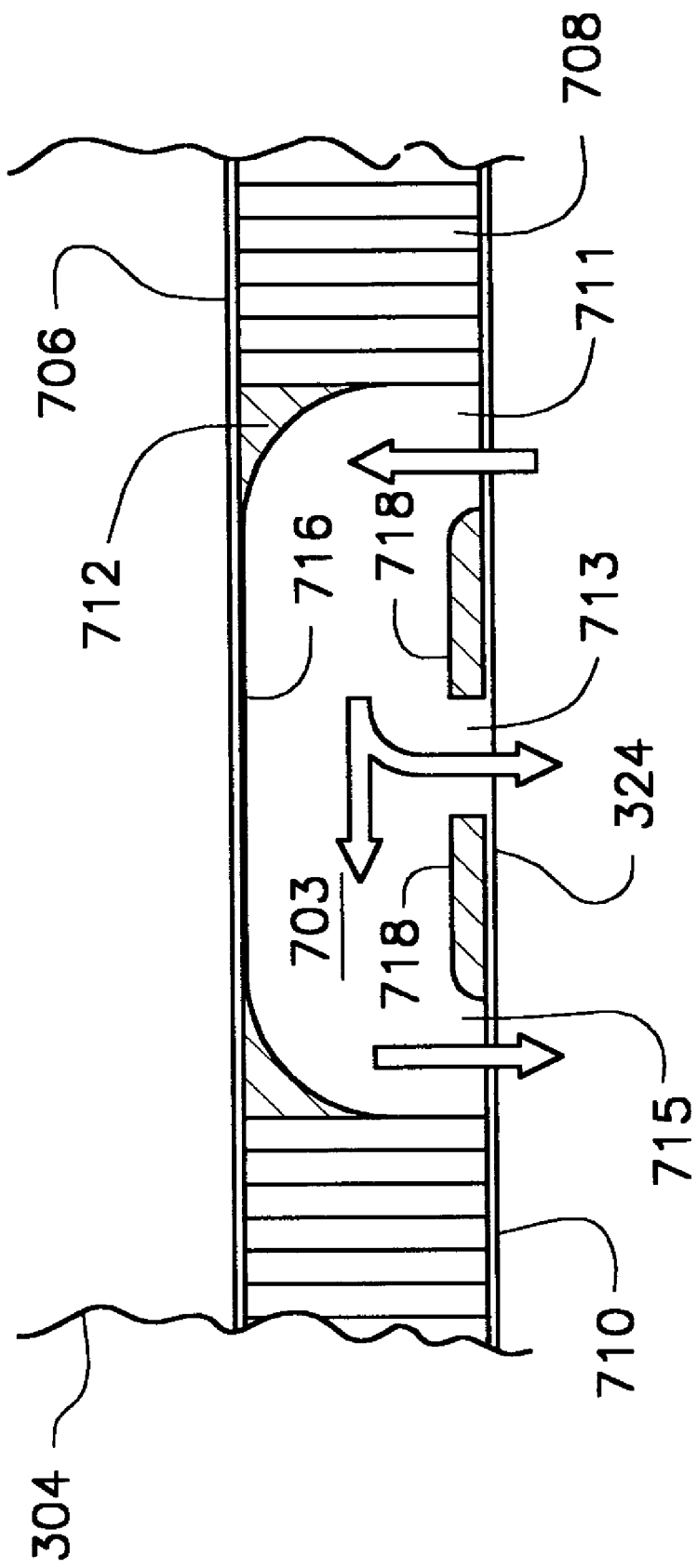
FIG. 7 depicts a cross-sectional view of another embodiment of the assembly of this invention.

FIG. 7 depicts another embodiment of this invention, in which the embodiment depicted is a cross-sectional view of the nacelle portion designated "J" in FIG. 3. In FIG. 7, the assembly is made up of a backskin 706, a honeycomb-shaped core 708, and a perforated skin 710 which forms at least a part of the inner wall of nacelle inlet 324, as shown. A septum (not shown in FIG. 7) may optionally be employed. In this embodiment, conduit-defining member 712 is machined or otherwise formed or fabricated from a solid material such as aluminum or another suitable acoustically impervious material and placed in a cavity formed in core 708. Conduit-defining member 712 contains a conduit 703 defined by outer wall 716 and inner wall 718, and having an entrance end 711 and multiple exit ends 713 and 715. As depicted in FIG. 7, inner wall 718 is essentially parallel to the inner wall (which in this embodiment is perforated skin 710) of nacelle inlet 324, and outer wall 716 is substantially parallel to backskin 706. Acoustic energy (indicated by arrows) passes through perforated skin 710, enters conduit 703 via entrance end 711, and exits via exit ends 713 and 715. The presence of more than one exit end provides enhanced acoustic performance by permitting two tones or noise frequencies to be attenuated, thereby enhancing the noise reduction achieved using this invention.

FIGS. 8A and 8B depict cross-sectional and bottom views, respectively, of the configuration of the conduit-defining member portion 412 depicted in FIG. 4A. In FIGS. 8A and 8B, conduit defining-member 412 is fabricated such that it has apertures 411 and 413 in floor portion 420. Conduit 403 is defined by outer wall 416 and inner wall 418. Apertures 413 and 411 act as entrance and exit ends, respectively, as previously described.

FIGS. 9A and 9B depict cross-sectional and bottom views, respectively, of another embodiment of a conduit-defining member which may be used in this invention. Conduit-defining member 912 is fabricated such that it has apertures 911 and 913 in floor portion 922. Apertures 913 and 911 act as entrance and exit ends, respectively, as previously described. In FIG. 9A, the entire ceiling portion 920 is open, although in other embodiments only a part of the ceiling portion may be open. Conduit-defining member 912 may be placed in cavity 401 of core 408 (as previously described with respect to FIG. 4A), and a backskin or panel 406 may be placed adjacent to ceiling portion 920 of conduit-defining member 912, such that backskin or panel 406 and floor portion 922 define conduit 903 in conduit-defining member 912.

FIG. 10A depicts an exploded view of an embodiment of the assembly of this invention using conduit-defining member portion 412, as depicted in FIG. 4A. As shown in FIG. 10A, the assembly contains backskin 406, upper core 414 having cavity 401 therein, conduit-defining member 412 which resides in cavity 401 (when assembled), lower core 415 and perforated skin 410. A septum (not shown in FIG. 10A) may optionally be employed.

FIG. 10B depicts an exploded view of an embodiment of the assembly of this invention using conduit-defining member 912, as depicted in FIGS. 9A and 9B. As shown in FIG. 10B, the assembly contains backskin 406, upper core 414 having cavity 401 therein, conduit-defining member 912 which resides in cavity 401 (when assembled), lower core 415 and perforated skin 410. A septum (not shown in FIG. 10B) may optionally be employed.

FIGS. 11A, 11B, 12A, 12B, 13A and 13B set forth one embodiment of a method of making the assembly of this invention. FIG. 11A depicts a support member 1102 having a plurality of vertical walls 1104. Support member 1102 and vertical walls 1104 may be fabricated from aluminum or another suitable rigid material. FIG. 11B depicts a plurality of enclosure members 1106 which may also be manufactured from aluminum or another suitable material. In this embodiment, the enclosure members 1106 are approximately elliptical in shape. Enclosure members 1106 may be fabricated from a single strip which is then bent or formed to the desired shape, where interface 1108 is the interface between the two ends of the strip. In other embodiments, enclosure members 1106 may be continuous pieces without interface 1108.

FIGS. 12A and 12B depict the preparation of the support member 1102 and enclosure members 1106 to form a subassembly 1110. As shown, the support member 1102 and enclosure members 1106 are joined to each other to form the subassembly 1110. The support member 1102 and enclosure members 1106 may be joined by conventional means, such as LID bonding.

FIG. 13A depicts preparation of another embodiment of this invention employing subassembly 1110 as shown in FIG. 12B. In FIG. 13A, core portion 1112, which may be a honeycomb material as previously described, is shown having a cavity 1114 therein. Septum 1116 (which optionally may be removed in the region of cavity 1114) is adjacent to core portion 1112, and perforated skin 1118 is adjacent to septum 1116. As shown in FIG. 13B, subassembly 1110 is placed within the cavity or aperture 1114 such that subassembly 1110 is adjacent to septum 1116 (or perforated skin 1118 if the septum 1116 has been locally removed in the region of cavity 1114). Subassembly 1110 forms a plurality of conduit-defining members of the type depicted in FIGS. 9A and 9B. A backskin (not shown in FIGS. 13A or 13B) is thereafter applied to face 1120 of core 1112 to form the final assembly, which may be employed, for example, in an engine case liner or engine core cowl structure. This structure results in a plurality of adjacent conduit-defining members arranged adjacent to one another, such that when the structure is installed in a gas turbine engine, the conduit-defining members have the major axes thereof aligned parallel to the engine major axis.

The assembly of this invention may extend circumferentially about nacelle inlet 324 as depicted in FIG. 3. In other embodiments, the assembly may also be positioned in other locations, such as the bypass duct or primary nozzle. It will be understood by those skilled in the art that the assembly may extend or be axially located forward or aft of nacelle portion J shown in FIG. 3. For example, assemblies of this invention may be located in the core cowl 366, the engine core casing 367, and/or the center body 360.

It will also be understood by those skilled in the art that more than one assembly as described herein may be employed within a given engine nacelle inlet, engine fan case, nacelle core cowl, engine core casing, nacelle center body, etc.

It will also be understood by those skilled in the art that the location of the exit end or ends relative to the entrance end in the various embodiments of the assembly of this invention may be asymmetrically varied longitudinally or axially, and that the entrance end and/or exit end or ends may be angled or offset with respect to the engine axis. For example, FIG. 14B depicts a core assembly 1458 having a conduit 1453 with entrance end 1461 and exit end 1463, which are asymmetrically positioned with respect to center line CL, as shown. It will also be understood by those skilled in the art that the cross-sectional areas of the entrance and exit ends may be unequal. For example, FIG. 14A depicts a core assembly 1408 having a conduit 1403, with entrance end 1411 and exit end 1413. Entrance end 1411 and exit end 1413 have unequal cross-sectional areas. It will also be understood that the cross-sectioned shapes of the entrance and exit ends may be circular, elliptical or any other shape that allows acoustic energy to pass therethrough.

Without wishing to be bound by any one theory, it is expected that in this invention non-uniform noise energy is generated during operation of the engine. The assembly of this invention is employed to allow such non-uniform noise energy to pass therethrough, and to be reintroduced into the non-uniform noise energy in an out-of-phase relation to the non-uniform noise energy itself to effect sound cancellation and noise abatement.

While the invention has been described in terms of its preferred embodiments, those skilled in the art will recognize that the invention can be practiced with modification within the spirit and scope of the appended claims.

The invention claimed is:

1. An assembly for reducing aircraft engine noise comprising:
    (a) a core portion comprising at least one conduit having an entrance end and at least one exit end for the passage of acoustic energy therethrough;
    (b) a first member having an exterior face and an interior face, wherein the first member is adjacent to at least a part of the core portion, and the first member has a plurality of openings therein to permit the passage of acoustic energy therethrough; and
    (c) a second member having an exterior face and an interior face, wherein the interior face of the second member is adjacent to the core portion.

2. The assembly of claim 1, in which the core portion is a honeycomb structure.

3. The assembly of claim 1, in which the first member is perforated.

4. The assembly of claim 3, in which the perforations are operatively adjacent to the entrance and exit ends to permit the passage of acoustic energy therethrough.

5. The assembly of claim 1, in which the core portion comprises a first core portion having entrance and exit ends and a second core portion located between the first core portion and the first member.

6. The assembly of claim 5, in which a septum does not reside between the entrance and exit ends of the first core portion and the second core portion.

7. The assembly of claim 1, in which the core portion comprises an entrance end and a plurality of exit ends.

8. The assembly of claim 7, in which the core portion comprises an entrance end and first and second exit ends.

9. The assembly of claim 1, in which the assembly does not include a passive liner treatment.

10. A system for reducing aircraft engine noise comprising:
    (a) means for generating non-uniform noise energy about an aircraft structure; and
    (b) an assembly for reducing aircraft noise comprising:
        (i) a core portion comprising at least one conduit having an entrance end and at least one exit end for the passage of acoustic energy therethrough,
        (ii) a first member having an exterior face and an interior face, wherein the first member is adjacent to at least a part of the core portion, and the first member has a plurality of openings therein to permit the passage of acoustic energy therethrough, and
        (iii) a second member having an exterior face and an interior face, wherein the interior face of the second member is adjacent to the core portion.

11. The system of claim 10, in which the core portion comprises at least one conduit.

12. A method of preparing an assembly for reducing aircraft engine noise, the method comprising:
    (a) providing a support member having a plurality of vertical walls;
    (b) providing a plurality of enclosure members having a plurality of vertical walls;
    (c) forming a subassembly by having at least one vertical wall of at least one enclosure member adjoin at least one vertical wall of at least one support member;
    (d) providing a core portion having an aperture, a first face, and a second face;
    (e) providing a first member having an exterior face and interior face, wherein the interior face of the first member is adjacent to at least a part of the first face of the core portion, and the first member has a plurality of openings therein to permit the passage of acoustic energy therethrough;
    (f) providing the subassembly into the core aperture; and
    (g) providing a second member adjacent to the second face of the core portion, such that the subassembly and second member define a conduit to permit the passage of acoustic energy therethrough.

13. The method of claim 12, in which the core portion is a honeycomb structure.

14. The method of claim 12, in which the first member is perforated.

15. The method of claim 14, in which the perforations are operatively associated with the enclosure members to permit the passage of acoustic energy therethrough.

16. The method of claim 12, in which the core portion comprises a first core portion having the core aperture therein and a second core portion located between the first member and the subassembly.

17. The method of claim 12, in which a septum is provided between the interior face of the first member and the subassembly.

18. The method of claim 17, in which the septum is removed in the region of the core portion aperture.

19. An assembly for reducing aircraft engine noise comprising:
    (a) a core portion comprising at least one entrance end and at least one exit end for the passage of acoustic energy therethough;
    (b) a first member having an exterior face and an interior face, wherein the first member is adjacent to at least a part of the core portion, the first member has a plurality of openings therein to permit the passage of acoustic energy therethrough, the core portion comprises a first core portion having entrance and exit ends and a second core portion located between the first core portion and the first member, and a septum between the entrance and exit ends of the first core portion and the second core portion; and
    (c) a second member having an exterior face and an interior face, wherein the interior face of the second member is adjacent to the core portion.

20. An assembly for reducing aircraft engine noise comprising:
    (a) a core portion comprising at least one conduit defined by an inner wall and an outer wall, and having an entrance end and at least one exit end for the passage of acoustic energy therethrough;
    (b) a first member having an exterior face and an interior face, wherein the first member is adjacent to at least a part of the core portion, and the first member has a plurality of openings therein to permit the passage of acoustic energy therethrough; and
    (c) a second member having an exterior face and an interior face, wherein the interior face of the second member is adjacent to the core portion.

* * * * *